United States Patent Office 3,527,281
Patented Sept. 8, 1970

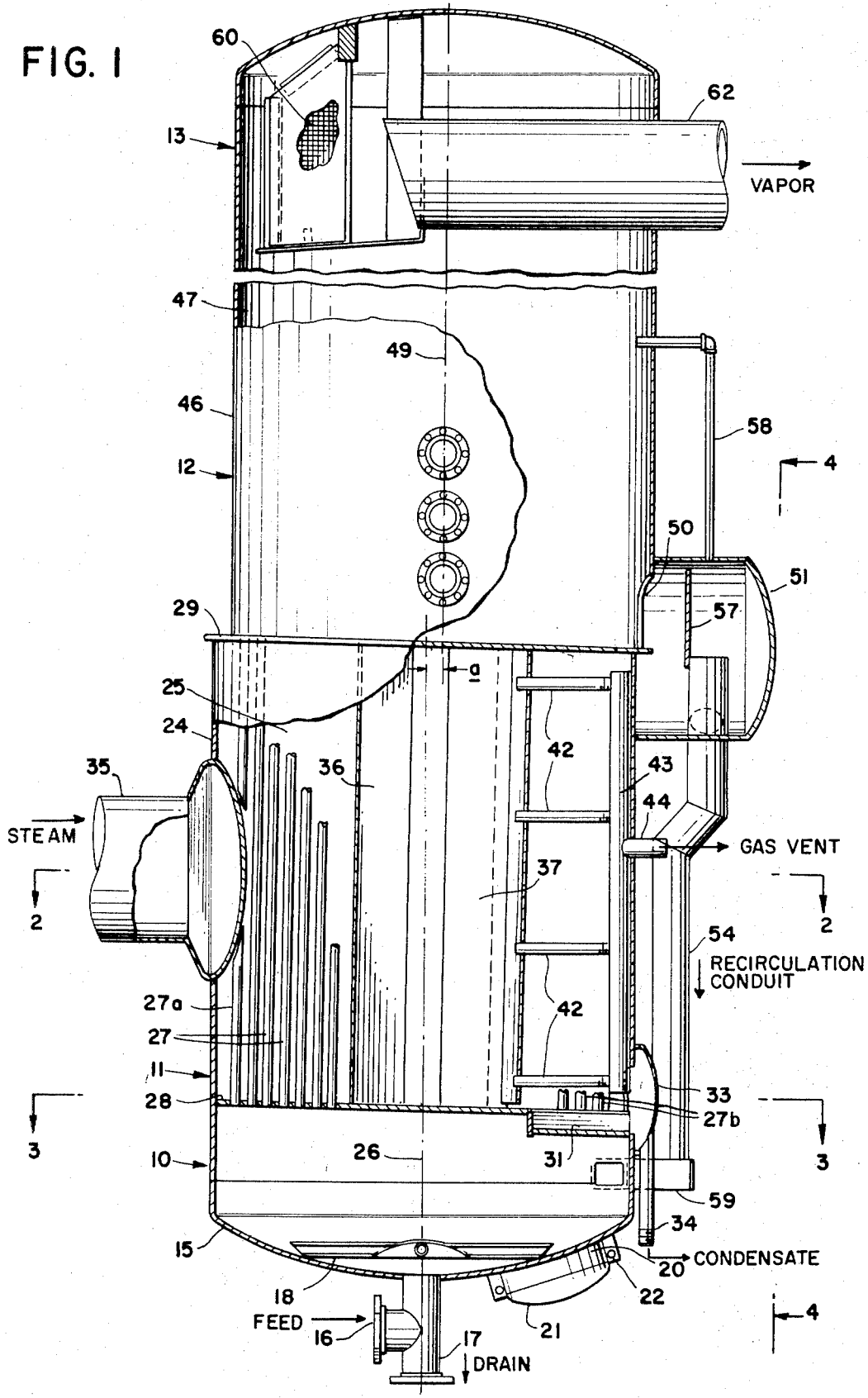

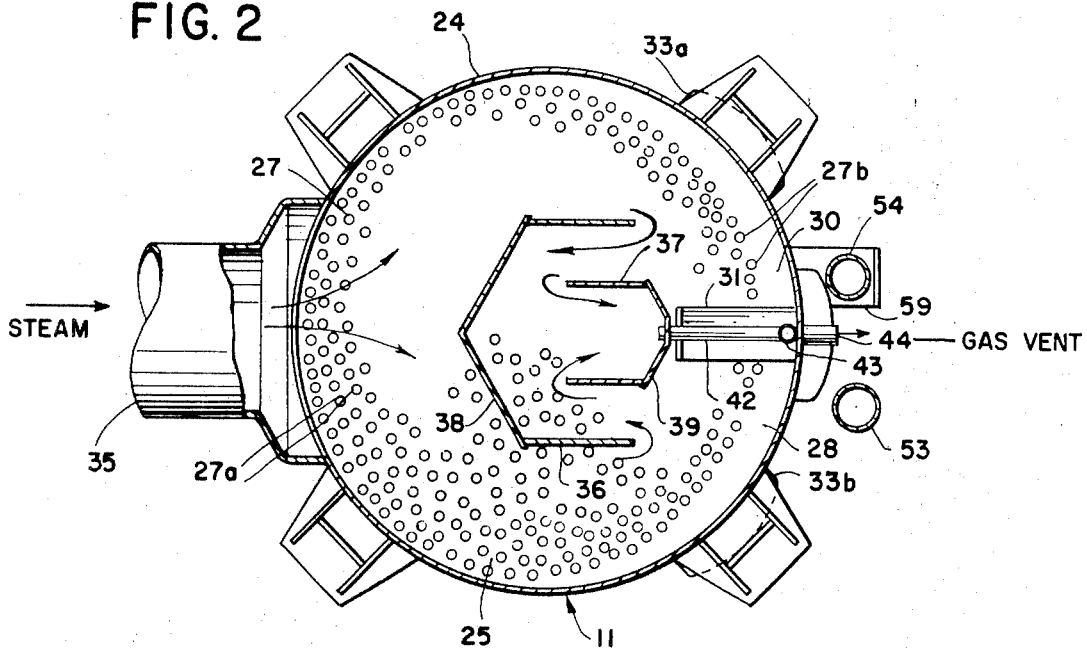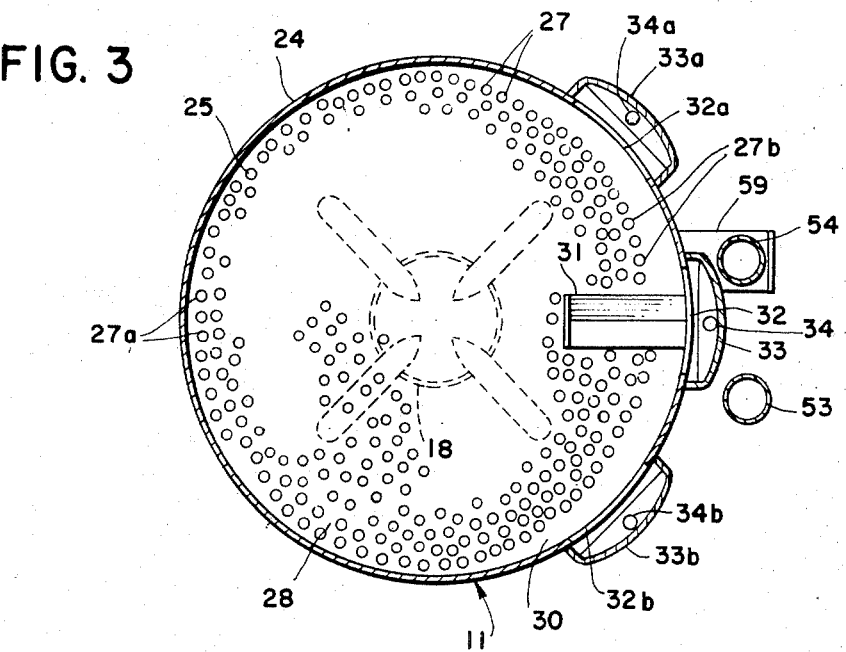

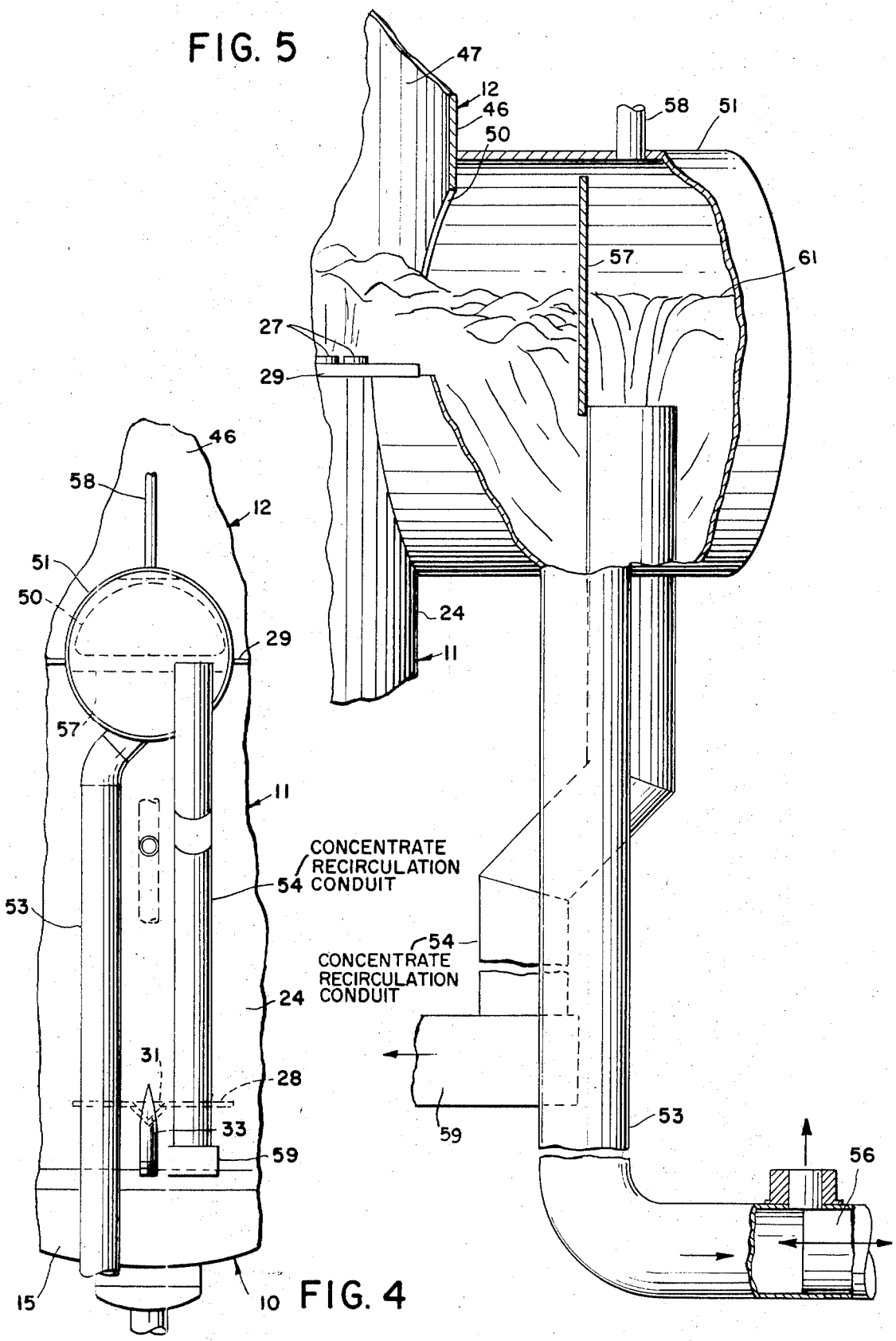

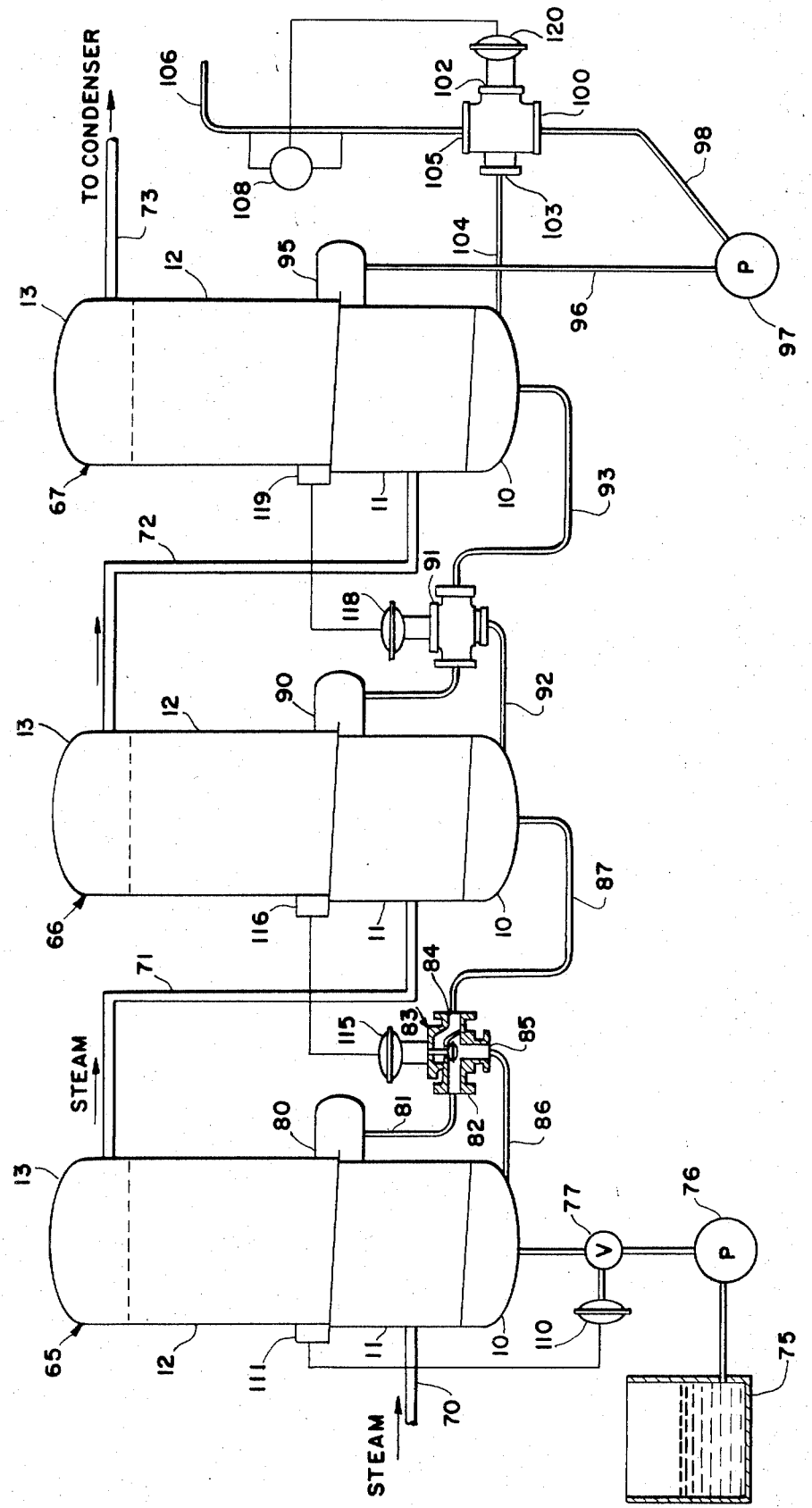

3,527,281
EVAPORATION SYSTEM
Thomas M. Hamill, P.O. Box 362,
Kailua, Hawaii 96734
Filed July 20, 1967, Ser. No. 654,890
Int. Cl. B01d 1/08, 1/26, 3/42
U.S. Cl. 159—17
17 Claims

ABSTRACT OF THE DISCLOSURE

An evaporation system for concentrating a liquid in which the recirculation of the concentrated liquid is prevented during normal operation but in which the outfeed conduits, valves, etc., are arranged such that the liquid may be automatically recirculated in response to such predetermined conditions as flow stoppages, level variations, density, salinity and other factors. The evaporator includes a slanting tube calandria in which the tube sheets are at right angles to the tubes such that there is provided a sloping, generally annular path of gradually increasing capacity along the lower tube sheet for the discharge of condensed vapor. The structure above the calandria is offset to facilitate the removal of the tubes for cleaning purposes, for example.

---

This invention relates to an evaporation system and more particularly to an evaporator for rapidly and economically concentrating a liquid in a novel and unique manner.

The present invention, while of general application, is particularly well suited for use in the manufacture of sugar. As is well known, in the production of sugar from cane, for example, the harvested product is first shredded and is then passed through a series of heavy rollers which squeeze out much of the juice. Hot water is sprayed over the cane as it moves through the rollers, and after straining and chemical treatment to remove impurities the extracted juice is directed through an evaporation system to concentrate the juice in the form of a syrup. The syrup is then fed to one or more vacuum pans where crystallization takes place. The liquid customarily is separated from the crystals centrifugally, and the crystals are thereafter dried and subjected to various refining processes.

The evaporation step in the process commonly is performed by a series of multiple-effect evaporators. Each of the evaporators includes a steam-heated calandria having vertical or slanting tubes for the incoming liquid. Evaporation takes place as the liquid moves through the tubes, and the remaining liquid heretofore has been withdrawn through a centrally located internal well or "down-take" within the calandria. The down-take commonly is in open communication with the inlet of the evaporator at all times, thus permitting the uncontrolled recirculation of the liquid through the tubes, although in other arrangements a sealed down-take is employed to positively prevent recirculation of the liquid. During the evaporation process, films of condensed vapor are formed on the exterior of the tubes and are removed through a suitable outlet.

Prior evaporation systems of the foregoing type have exhibited certain disadvantages. For example, difficulties have been encountered heretofore in the realization of optimum evaporation efficiency in cases in which the liquid is subjected to uncontrolled recirculation through the system. Although some degree of recirculation is needed to keep the liquid moving through the tubes during periods approaching no flow or shut-down, for example, to thereby avoid charring and other deleterious effects, the comparatively high temperature of the recirculated liquid has reduced the temperature differential across the heating surfaces formed by the tube walls and has thus impaired the efficiency of the evaporation process. In addition, in evaporators of the type in which the calandria is provided with slanting tubes in order to avoid the accumulation of thick films of condensed vapor, difficulties often resulted in the removal of the tubes for repair and in the ready withdrawal of the condensed vapor. Furthermore, it often has been difficult heretofore to control the circulation of the steam or other heating fluid and to provide for the optimum withdrawal of incondensible gases.

One general object of this invention, therefore, is to provide a new and improved evaporation system for concentrating a liquid.

More specifically, it is an object of this invention to provide a system of the character described in which the recirculation of the liquid normally is prevented but in which such recirculation may be accomplished in a rapid and economical manner under predetermined conditions.

Another object of this invention is to provide an evaporation system in which the slanting tubes of the calandria may be readily removed.

A further object of the invention is to provide an evaporation system in which the circulation of the heating fluid is positively controlled during its passage through the evaporator.

Still another object of the invention is to provide a new and improved evaporation system that is economical to manufacture and thoroughly reliable in operation.

In one illustrative embodiment of this invention, the evaporation system includes an upstanding, generally cylindrical calandria having a plurality of slanting tubes and a pair of flat plates or tube sheets at opposite ends of the tubes. Steam or other heating fluid is introduced into the calandria and around the tubes, where it condenses on the exterior of the tubes and flows onto the lower tube sheet. The liquid to be concentrated passes through the tubes and is received in concentrated form within a cylindrical vapor chamber adjacent the upper tube sheet. The concentrated liquid is removed from an outlet which is mounted on the side of the evaporator and is externally disposed with respect to the calandria.

In accordance with one feature of the invention, in certain important embodiments, the outlet for the concentrated liquid is provided with novel conduit means for normally preventing recirculation of the liquid into the tubes but for automatically initiating such recirculation in response to flow stoppages, level variations, or other predetermined conditions. By controlling the recirculation of the liquid in this manner, the adverse effects of charring, etc., are minimized without impairing the evaporation efficiency of the system.

In accordance with another feature of the invention, in several good embodiments, the tube sheets at opposite ends of the slanting tubes meet the axes of the tubes at right angles and are thus disposed in slightly sloping planes. With this arrangement, the condensed steam or other heating fluid readily flows along the lower tube sheet and out through a suitable drain, while the concentrated liquid similarly flows along the upper tube sheet to the outlet. In addition, the arrangement provides an annular path for the condensed steam which extends around the tubes and is of gradually increasing capacity, thereby further facilitating the efficient removal of the condensate.

In accordance with a further feature of certain advantageous embodiments of the invention, the vapor chamber is disposed along a vertical axis which is parallel to but spaced from the vertical axis of the calandria. The arrangement is such that even the slanting tubes in close juxtaposition with the wall of the calandria may be readily rmoved without the need for disassembling the vapor chamber or other components of the system.

In accordance with a still further feature of some embodiments of the invention, there is provided a baffle structure within the calandria which provides a path for the incoming steam of gradually decreasing cross section. The steam divides and progresses around the tubes over a comparatively long balanced path and is returned by the baffles to a centrally located collector for the incondensible gases. The baffle structure insures a high and uniform steam velocity throughout the calandria such that the steam is effective to scrub away gas and condensate films on the tubes and thus further improve the heat transmission efficiency of the system.

The present invention, as well as further objects and features thereof, will be understood more clearly and fully from the following description of certain preferred embodiments, when read with reference to the accompanying drawings, in which:

FIG. 1 is a vertical sectional view, with certain portions shown in elevation, of evaporating apparatus in accordance with one illustrative embodiment of the invention;

FIG. 2 is a sectional view taken along the line 2—2 in FIG. 1;

FIG. 3 is a sectional view taken along the line 3—3 in FIG. 1;

FIG. 4 is a fragmentary side elevational view of a portion of the apparatus as seen from the line 4—4 in FIG. 1;

FIG. 5 is an enlarged front elevational view, with certain parts shown broken away and in section, of portions of the apparatus illustrated in FIG. 4; and FIG. 6 is a schematic representation of multiple-effect evaporating apparatus in accordance with another illustrative embodiment of the invention.

Referring to FIG. 1 of the drawings, there is shown an evaporator in accordance with a preferred embodiment of the invention which is of upstanding, generally cylindrical configuration. The evaporator includes an inlet section 10, a calandria 11, a vapor section 12 and a separation section 13 which are positioned one above the other in stacked array. The inlet section 10 is located at the bottom of the evaporator and comprises a cup-shaped shell 15 having a liquid receiving conduit 16 and a normally closed drain conduit 17 at the lower end thereof. In cases in which the evaporator is used in the manufacture of sugar, the liquid introduced into the conduit 16 is in the form of a thin juice of comparatively low density. Upon entering the shell 15 from the conduit 16, the juice is uniformly distributed within the shell by a juice distributor 18. Access to the shell may be had through a hatch 20 having a cover 21 which is slidably supported on spring mounted guide rods 22.

The shell 15 extends upwardly from the inlet section 10 to form a cylindrical side wall 24 for the calandria 11. The wall 24 defines a heating chamber 25 having a vertical axis indicated at 26 and a multiplicity of parallel tubes 27 therein. The tubes 27 are distributed substantially entirely throughout the heating chamber 25 and are arranged in slanting or sloping relationship with the wall 24 such that their axes are angularly disposed with respect to the vertical axis 26 of the chamber. The lower ends of the tubes 27 are positioned in corresponding apertures in a circular plate or tube sheet 28 which forms the bottom of the calandria 11. The upper ends of the tubes similarly are disposed in apertures in a circular tube sheet 29 at the top of the calandria. The lower tube sheet 28 fits within the shell 15, while the upper tube sheet 29 rests on top of the shell and is of somewhat larger diameter. The axis for each of the tubes 27 meets the tube sheets 28 and 29 at a right angle, the tube sheets being disposed in planes which have a small slope with respect to the horizontal.

The arrangement of the tubes 27 and the tube sheets 28 and 29 is such that the lower portions of the peripheral tubes 27a adjacent the left side of the calandria, as viewed in FIG. 1, are in close proximity to the adjacent cylindrical wall 24, while the remaining peripheral tubes are progressively spaced farther away from the wall 24. The lower portions of the peripheral tubes 27b, located one hundred and eighty degrees away from the tubes 27a adjacent the right side of the calandria, are spaced a comparatively large distance from the wall 24. As best shown in FIG. 3, this arrangement provides an annular condensate path 30 immediately above the tube sheet 28. The path 30 extends peripherally around the tubes and is of gradually increasing capacity from the tubes 27a to the tubes 27b. The lowermost part of the sloping tube sheet 28 includes a V-shaped drain gutter 31 adjacent the widest portion of the path 30. The gutter 31 communicates with an opening 32 in the shell 15 leading to a condensate removal dome 33. The dome 33 is disposed externally with respect to the calandria and is provided with a suitable outlet conduit 34. Generally similar openings 32a and 32b, domes 33a and 33b, and conduits 34a and 34b are located on opposite sides of the dome 33 in position to receive additional condensed vapor from the path 30.

A steam inlet conduit 35 (FIG. 1) is provided in the side wall 24 of the calandria 11 at a level corresponding to the approximate mid-point of the tubes 27. Mounted within the central portion of the calandria are two steam baffles 36 and 37 (FIG. 2) of generally U-shaped cross section. The baffle 36 is somewhat larger than the baffle 37 and includes a bight which is bent at an angle to form a deflecting surface 38 facing toward the inlet conduit 35. The baffle 37 is oppositely disposed within the baffle 36 with its bight surface 39 facing away from the conduit 35. A series of gas collection pipes 42 communicate with the interior of the baffle 37, and these pipes extend radially therefrom to a vertically disposed manifold 43. The manifold 43 is positioned within the heating chamber 25 immediately adjacent the side wall 24 and is vented to the atmosphere by a pipe 44.

The vapor section 12 is disposed immediately above the calandria 11. The section 12 comprises a cylindrical shell 46 which is mounted on the upper surface of the tube sheet 29 and encloses a vapor chamber 47 adjacent the tube sheet. The shell 46 has a vertical axis 49 which is offset with respect to the vertical axis 26 of the calandria 11 by a distance $a$. This distance is sufficient to permit the ready removal of the peripheral tubes 27b adjacent the right portion of the calandria, as viewed in FIG. 1, for repair or replacement. The arrangement is such that ample clearance is provided for all of the tubes within the calandria without the need for disassembling the shell 46 or other structure thereabove.

The shell 46 includes an outfeed opening 50 immediately above the upper tube sheet 29. This opening connects the vapor chamber 47 with a discharge enclosure in the form of an outlet dome 51. The dome 51 is mounted on the wall 24 and the shell 46 and is externally disposed with respect to both the chamber 47 and the calandria 11. As best shown in FIGS. 4 and 5, the dome communicates with two external conduits 53 and 54. The upper end of the conduit 53 is disposed adjacent the bottom of the dome, and the conduit 53 extends downwardly and outwardly therefrom to the liquid receiving conduit of a succeeding evaporator or to the inlet of a vacuum pan supply tank (not shown), for example. The succeeding evaporator or supply tank may be provided with a two-way valve 56 of conventional construction.

The upper end of the conduit 54 protrudes into the outlet dome 51 and is disposed a considerable distance above the corresponding end of the conduit 53 and a short distance beneath the horizontal axis of the dome. A baffle plate 57 is positioned within the dome 51 immediately adjacent the conduit 54, and a vent pipe 58 interconnects the interior of the dome and the vapor chamber 47. As best shown in FIG. 1, the conduit 54 extends in a downward direction from the dome 51 and is connected at its lower end to a recirculation inlet 59. The inlet 59 communicates with the inlet section 10.

The vapor separation section 13 of the evaporator is formed by the upper portion of the shell 46 and is in open communication with the vapor chamber 47. The section 13 includes an angularly disposed screen structure 60 which is suspended from the uppermost portion of the shell 46. The inner end of a vapor outlet conduit 62 is positioned immediately adjacent the screen structure 60, and the conduit protrudes outwardly in a horizontal direction through the wall of the shell.

In operation, juice or other liquid to be concentrated is continuously introduced into the inlet section 10 through the liquid receiving conduit 16 and is evenly distributed within the section by the juice distributor 18. The liquid then flows through the slanting tubes 27 in the calandria 11. The heat from the steam surrounding the tubes 27 produces substantial evaporation of the liquid, and the resulting vapor is discharged from the upper ends of the tubes into the vapor section 12 and the separation section 13. The concentrated liquid similarly proceeds into the section 12 where it forms a viscous, bubbly mass of condensed syrup, illustratively several inches thick, on the upper surface of the tube sheet 29. As a result of the sloping orientation of the sheet 29, the syrupy mass flows by gravity through the outfeed opening 50 and into the outlet dome 51.

Under normal operating conditions, the rate of flow of the concentrated syrup into the outlet dome 51 is such that the level of the syrup within the dome is maintained beneath the upper end of the recirculation conduit 54. The syrup flows through the adjacent discharge conduit 53 to a succeeding evaporator, vacuum pan tank or other processing apparatus. By maintaining the syrup within the dome below the level of the conduit 54, the possibility of recirculating the syrup into the inlet section 10 is positively prevented. In many types of evaporators employed heretofore, the syrup has been recirculated several times through the system before proceeding to the succeeding stage in the process. Because of the relatively high temperature of the recirculated syrup, the temperature differential across the heating surfaces formed by the walls of the calandria tubes was substantially reduced, with the result that the evaporation efficiency of the system has been impaired. In some cases such loss in efficiency has resulted in a decrease in the overall capacity of the evaporator by as much as twenty-three and one-half percent. By utilizing the upper portion of the conduit 54 to prevent all possibility of recirculation during normal operation, these losses in evaporation efficiency and capacity are eliminated, and optimum operation is insured.

In many types of evaporators, it is important that the liquid be kept moving through the calandria tubes at all times. Should the liquid become stagnant or trapped in the tubes, charring or coloring may take place because the large amount of condensible heat within the calandria causes overheating of the liquid within the tubes, with the result that the purity of the liquid is impaired. Accordingly, when the evaporator is shut down because of temporary mill stoppages, or in cases in which the level of the liquid exceeds the output capacity of the evaporator, for example, it is desirable to continuously recirculate the liquid to prevent stagnation within the tubes.

Such recirculation is accomplished in a rapid and straightforward manner by the outlet dome 51 and the recirculation conduit 54. Thus, as best shown in FIG. 5, should the system be shut down by the closing of the valve 56, the level of the concentrated syrup 61 within the dome 51 builds up until it is above the upper end of the conduit 54. The syrup 61 thereupon automatically flows through the conduit 54 and is returned to the inlet section 10 through the recirculation inlet 59, where it is again directed through the tubes 27 to the vapor section 12. Similarly, should the level of the syrup in the section 12 for any reason exceed the desired level, the excess syrup is recirculated through the conduit 54 and the inlet 59. The arrangement is such that the conduit 54 positively prevents recirculation of the concentrated liquid during normal operating conditions but automatically recirculates the liquid in response to flow stoppages, level increases, or other predetermined conditions. This recirculation is accomplished without the need for complex sensing devices, three-way valves or other moving parts in the evaporator outlet.

The steam or other heating fluid for the evaporator is continuously introduced into the side wall of the calandria 11 through the inlet conduit 35. The steam follows a tortuous controlled path around each of the tubes 27 to provide a high temperature differential between the exterior and the interior of the tubes. The steam condenses on the tubes 27 and flows downwardly to the lower tube sheet 28. In cases in which vertically disposed tubes are employed, the condensate tends to form thick descending films which entirely cover the lower periphery of the tubes and reduce their effectiveness in the transmission of heat. By slanting the tubes in the manner shown in FIG. 1, for example, the condensate is shed on the underside of each tube to leave the major portion of the heating surface free of the thick film. As a result, the entire length of each tube is utilized to produce considerably greater heat transmission efficiency.

As indicated heretofore, the provision of slanting tubes and a sloping lower tube sheet at right angles to the tubes, in conjunction with the upright cylindrical wall of the calandria, results in the annular path 30 (FIG. 3) above the lower tube sheet 28 which is of gradually increasing capacity from the steam inlet side of the calandria to the condensate discharge side. The sloping lower tube sheet enables the flow of condensed vapor along this path from beneath the steam inlet to the drain gutter 31. With this arrangement, the removal of the condensate is greatly facilitated, and any substantial build-up in condensate level, which might otherwise cover the lower portions of the tubes and reduce the available heating surfaces, is avoided.

The baffles 36 and 37 (FIG. 2) within the calandria 11 insure that the incoming steam flows uniformly over the tubes 27. The steam entering the inlet conduit 35 divides and progresses over a comparatively long balanced path on either side of the calandria and then successively enters the baffles 36 and 37. It will be noted that the cross sectional area of the steam path is gradually reduced in the direction of flow. As the steam moves along this path and progressively condenses on the surfaces of the tubes 27, a high and uniform steam velocity is maintained along the path, and the steam is effective to scrub away gas and condensate films which might otherwise form on the heating surfaces. Any air or other incondensible gases within the steam are received by the gas collection pipes 42 and are led through the manifold 43 to the vent pipe 44. The efficient removal of incondensible gases in this manner prevents the build-up of gases within the calandria and provides a further improvement in the heat transfer efficiency of the system.

The hot vapor emanating from the upper ends of the tubes 27 as a result of the evaporation of the liquid proceeds into the vapor chamber 47 and upwardly through the separation section 13. The vapor is scrubbed by the screen structure 60, and the entrained moisture is separated by centrifugal action and is returned to the mass of liquid on the tube sheet 29. The vapor is discharged through the horizontal outlet conduit 62 and customarily is led to the steam inlet conduit of the calandria for a succeeding evaporator.

Referring now to FIG. 6, there is shown a schematic representation of three evaporators 65, 66 and 67 which are connected in series with each other in a typical sugar factory installation. In practice, the number of evaporators may be substantially in excess of three, but only three have been shown for convenience of illustration. Each of the evaporators 65, 66 and 67 may be of the type described heretofore and comprises the inlet section 10, the calandria 11, the vapor section 12 and the separation section 13. Steam or other heating fluid is introduced into the evaporator 65 through a conduit 70, while conduits 71 and 72 respectively connect the vapor outlets of the evaporators 65 and 66 with the steam inlets of the evaporators 66 and 67. The vapor outlet conduit 73 for the last evaporator in the series leads to a suitable condenser (not shown).

The liquid to be evaporated proceeds from a storage tank 75 through a supply pump 76 and a two-position valve 77 to the inlet section 10 of the evaporator 65. The concentrated syrup from the vapor section 12 of the evaporator 65 flows into an external outlet dome 80. This dome is generally similar to the outlet dome 51 (FIG. 1) described above but is provided with only a single discharge condut 81 rather than the two conduits 53 and 54. The conduit 81 leads to the inlet 82 of a three-way valve 83 having two outlets 84 and 85. The outlet 85 is connected to a recirculation conduit 86 leading back to the inlet section of the evaporator 65, while the outlet 84 is connected to a liquid inlet conduit 87 for the succeeding evaporator 66.

In a similar manner, the concentrated syrup from the evaporator 66 proceeds from an external outlet dome 90 to a three-way valve 91 and then either back to the evaporator through a recirculation conduit 92 or to an inlet conduit 93 for the evaporator 67. From the outlet dome 95 of the evaporator 67, the syrup is directed through a conduit 96, an outlet pump 97 and a conduit 98 to the inlet 100 of a three-way valve 102. One of the outlets 103 of the valve 102 is connected to a recirculation conduit 104 leading back to the inlet section of the evaporator 67. The other outlet 105 is connected to a discharge conduit 106 having a suitable density sensing device 108 therein. The conduit 106 then proceeds to a vacuum pan tank (not shown) or other stage in the process. Under normal operating conditions, the recirculation outlets of the valves 83, 91 and 102 are closed to prevent the recirculation of the concentrated liquid through the calandria tubes of the evaporators.

The two-way inlet valve 77 is operated by an automatic controller 110 in response to variations in liquid level within the evaporator 65. These variations are detected by a level sensing device 111. In cases in which the liquid level within the evaporator exceeds the desired level, the controller 110 automatically closes the valve 77 to shut off the flow of liquid to the system.

The three-way valves 83 and 91 on the outlet sides of the respective evaporators 65 and 66 are automatically controlled in response to the level of the concentrated liquid within the succeeding evaporators 66 and 67. Thus, the valve 83 for the evaporator 65 is provided with a controller 115 which is connected to a level sensing device 116 within the evaporator 66. Similarly, the valve 91 for the evaporator 66 includes a controller 118 operated by a level sensing device 119 in the evaporator 67. Should flow stoppages or other conditions occur which result in an undesirable increase in the liquid level within either of the evaporators 66 or 67, the corresponding sensing device 116 or 119 automatically actuates the associated valve 83 or 91 to initiate the recirculation of the liquid through the immediately preceding evaporators 65 or 66. An increase in the level within the evaporator 66, for example, actuates the valve 83 to prevent liquid flow from the outlet 84 and to initiate recirculation from the outlet 85 and the recirculation conduit 86 back to the inlet section 10 of the evaporator 65. In a similar manner, an increase in the level within the evaporator 67 is effective to recirculate the liquid through the evaporator 66. One advantage of automatically recirculating the liquid by means of the three-way valves 83 and 91 is that only a single discharge conduit need be provided for each of the outlet domes 80 and 90.

The recirculation of the liquid within the evaporator 67 is controlled in response to the density of the liquid within the discharge conduit 106. In cases in which the liquid being discharged has not been sufficiently concentrated, the density sensing device 108 operates a controller 120 for the three-way valve 102 to block the outlet 105 and to initiate liquid flow through the outlet 103 and the conduit 104 to the inlet section of the evaporator 67. The liquid is thus recirculated through the evaporator 67 until such time as it becomes sufficiently concentrated to again permit liquid flow through the discharge conduit 106.

The terms and expressions that have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. In an evaporation system for concentrating a liquid, in combination:

calandria means including a first chamber having a plurality of substantially vertical parallel tubes disposed therein;

means connected to said calandria means for supplying heating fluid to said first chamber;

means defining a second chamber positioned superjacent said calandria means in communication with the interior of said tubes;

means for introducing liquid to be concentrated into said tubes, said liquid flowing through said tubes and being received in concentrated form within said second chamber;

outlet means communicating with said second chamber for receiving the concentrated liquid; and means connected to said outlet means for normally preventing any recirculation of the concentrated liquid into said tubes but for automatically recirculating said concentrated liquid through said tubes only in response to a predetermined increase in liquid level of the concentrated liquid.

2. In a multiple-effect evaporation system for concentrating a liquid, a plurality of evaporators each comprising, in combination:

calandria means including a heating chamber havin a plurality of substantially vertical parallel tubes disposed therein;

means connected to said calandria means for supplying heating fluid thereto;

means defining a vapor chamber positioned superjacent said calandria means in communication with the interior of said tubes;

means for introducing liquid to be concentrated into said tubes, said liquid flowing through said tubes and being received in concentrated form within said vapor chamber;

outlet means communicating with said vapor chamber for receiving the concentrated liquid, said outlet means including a discharge enclosure in direct open communication with said vapor chamber and an outfeed conduit leading from said discharge enclosure to a succeeding evaporator in said system for directing the concentrated liquid thereto, said discharge enclosure being externally disposed with respect to said calandria means; and means connected to said outlet means for normally preventing any recirculation of the concentrated liquid into said tubes but for automatically recirculating said concentrated liquid through said tubes only in response to a predetermined increase in liquid level of the concentrated liquid in said succeeding evaporator.

3. In an evaporation system of the character set forth in claim 2, said discharge enclosure comprising a dome protruding from said calandria means.

4. In an evaporation system of the character set forth in claim 2, said discharge enclosure being externally disposed with respect to both said heating chamber and said vapor chamber.

5. In an evaporation system for concentrating a liquid, in combination:
  calandria means including a heating chamber having a plurality of substantially vertical parallel tubes disposed therein;
  means connected to said calandria means for supplying heating fluid thereto;
  means defining a vapor chamber positioned adjacent said calandria means in communication with the interior of said tubes;
  means for introducing liquid to be concentrated into said tubes, said liquid flowing through said tubes and being received in concentrated form within said vapor chamber;
  outlet means communicating with said vapor chamber for receiving the concentrated liquid, said outlet means including a discharge enclosure in direct open communication with said vapor chamber and an outfeed conduit leading from said discharge enclosure, said discharge enclosure being externally disposed with respect to said calandria means, and
  means connected to said outlet means for normally preventing any recirculation of the concentrated liquid into said tubes but including a recirculation conduit communicating with said discharge enclosure at a location separate from said outfeed conduit for automatically recirculating said concentrated liquid through said tubes only in response to a predetermined increase in level of the concentrated liquid.

6. In a multiple-effect evaporation system for concentrating a liquid, a plurality of evaporators each comprising, in combination:
  calandria means including an upstanding heating chamber having a plurality of substantially vertical parallel tubes disposed therein;
  means connected to said calandria means for supplying heating fluid thereto;
  means defining a vapor chamber positioned superjacent said calandria means in communication with the interior of said tubes;
  means for introducing liquid to be concentrated into said tubes, said liquid flowing through said tubes and being received in concentrated form within said vapor chamber;
  outlet means communicating with said vapor chamber for receiving the concentrated liquid, said outlet means including a discharge enclosure in direct open communication with said vapor chamber and an outfeed conduit leading from said discharge enclosure to a succeeding evaporator in said system for directing the concentrated liquid thereto, said discharge enclosure being externally disposed with respect to said calandria means; and
  recirculation means including valve means connected to said outlet means for normally preventing any recirculation of the concentrated liquid into said tubes but including a recirculation conduit connected to said valve means for automatically recirculating said concentrated liquid through said tubes only in response to a predetermined increase in liquid level of the concentrated liquid in said succeeding evaporator.

7. In an evaporation system for concentrating a liquid, in combination:
  calandria means including an upstanding cylindrical heating chamber having a vertical axis, a plurality of substantially vertical parallel tubes disposed within said heating chamber, and a pair of sloping tube sheets at opposite ends of said tubes, said tubes extending along axes which are angularly disposed with respect to said vertical axis and which meet said tube sheets at right angles;
  means connected to said calandria means for supplying condensible heating fluid thereto;
  means defining a cylindrical vapor chamber positioned superjacent the upper one of said tube sheets in communication with the interior of said tubes, said vapor chamber being disposed along an axis parallel to but spaced from the axis of said calandria means in the direction of inclination of the tubes;
  means positioned adjacent the other of said tube sheets for introducing liquid to be concentrated into said tubes, said liquid flowing through said tubes and being received in concentrated form within said vapor chamber; and
  outlet means communicating with said vapor chamber for receiving the concentrated liquid, said outlet means being externally disposed with respect to said calandria means.

8. In an evaporation system of the character set forth in claim 7, the calandria means including a drain opening and a cylindrical side wall which defines with said tubes an annular condensate path of gradually increasing capacity, said heating fluid being condensed within said calandria means and flowing along said path to said drain opening.

9. In an evaporation system of the character set forth in claim 7, in combination: recirculation means and valve means connected to said outlet means for normally preventing any recirculation of the concentrated liquid into said tubes but for automatically recirculating said concentrated liquid through said tubes only in response to a predetermined increase in liquid level of the concentrated liquid.

10. In an evaporation system for concentrating a liquid, in combination:
  calandria means including a heating chamber having a plurality of substantially vertical parallel tubes disposed therein and a pair of tube sheets at opposite ends of said tubes, said tubes extending along axes which are angularly disposed with respect to said calandria means and which meet said tube sheets at right angles;
  means connected to said calandria means for supplying heating fluid thereto, said heating fluid including both condensible and incondensible gases;
  means forming a pair of separate openings in said calandria means, the condensible gases being condensed within said heating chamber and the resulting condensate being withdrawn from said calandria means through one of said openings, the incondensible gases being withdrawn from said calandria means through the other of said openings;
  means defining a vapor chamber positioned superjacent the upper one of said tube sheets in communication with the interior of said tubes;
  means positioned adjacent the other of said tube sheets for introducing liquid to be concentrated into said tubes, said liquid flowing through said tubes and being received in concentrated form within said vapor chambers;
  outlet means communicating with said vapor chamber for receiving the concentrated liquid, said outlet means including a discharge enclosure communicating with said vapor chamber and an outfeed conduit leading from said discharge enclosure; and
  means including a recirculation conduit for recirculating the concentrated liquid through said tubes, said recirculation conduit having an infeed end protruding into said discharge enclosure and being disposed at a level higher than said outfeed conduit.

11. In an evaporation system for concentrating a liquid, in combination:

calandria means including a heating chamber having a plurality of substantially vertical parallel tubes disposed therein and a pair of tube sheets at opposite ends of said tubes;

means connected to said calandria means for supplying heating fluid thereto;

baffle means disposed within said heating chamber and forming a path of gradually decreasing cross section for the fluid within said chamber;

means defining a vapor chamber positioned adjacent one of said tube sheets in communication with the interior of said tubes;

means positioned adjacent the other of said tube sheets for introducing liquid to be concentrated into said tubes, said liquid flowing through said tubes and being received in concentrated form within said vapor chamber;

outlet means communicating with said vapor chamber for receiving the concentrated liquid, said outlet means including a discharge enclosure communicating with said vapor chamber and an outfeed conduit leading from said discharge enclosure; and means including a recirculation conduit for recirculating the concentrated liquid through said tubes, said recirculation conduit having an infeed end protruding into said discharge enclosure and being disposed at a level higher than said outfeed conduit.

12. In an evaporation system for concentrating a liquid, in combination:

calandria means including an upstanding heating chamber having a vertical axis, a plurality of substantially vertical parallel tubes disposed within said heating chamber, and a pair of tube sheets at opposite ends of said tubes;

means connected to said calandria means for supplying heating fluid thereto, said heating fluid including both condensible and incondensible gases;

means forming a pair of separate openings in said calandria means, the condensible gases being condensed within said heating chamber and the resulting condensate being withdrawn from said calandria means through one of said openings, the incondensible gases being withdrawn from said calandria means through the other of said openings;

baffle means disposed within said heating chamber and forming a path of gradually decreasing cross section for the fluid within said chamber;

means defining a vapor chamber positioned adjacent one of said tube sheets in communication with the interior of said tubes;

means positioned adjacent the other of said tube sheets for introducing liquid to be concentrated into said tubes, said liquid flowing through said tubes and being received in concentrated form within said vapor chamber;

outlet means communicating with said vapor chamber for receiving the concentrated liquid, said outlet means including a discharge enclosure communicating with said vapor chamber and an outfeed conduit leading from said discharge enclosure; and means including a recirculation conduit for recirculating the concentrated liquid through said tubes, said recirculation conduit having an infeed end protruding into said discharge enclosure and being disposed at a level higher than said outfeed conduit.

13. In an evaporation system of the character set forth in claim 12, the opening for said incondensible gases communicating with said baffle means; and a gutter formed in said other of said tube sheets adjacent the opening for said condensate.

14. In an evaporation system for concentrating a liquid, in combination:

calandria means including an upstanding heating chamber having a vertical axis, a plurality of substantially vertical parallel tubes disposed within said heating chamber, and a pair of sloping tube sheets at opposite ends of said tubes;

means connected to said calandria means for supplying heating fluid thereto, said heating fluid including both condensible and incondensible gases;

means forming a pair of separate openings in said calandria means, the condensible gases being condensed within said heating chamber and the resulting condensate being withdrawn from said calandria means through one of said openings, the incondensible gases being withdrawn from said calandria means through the other of said openings;

baffle means disposed within said heating chamber and forming a path of gradually decreasing cross section for the fluid within said chamber;

means defining a vapor chamber positioned superjacent the upper one of said tube sheets in communication with the interior of said tubes;

means positioned adjacent the other of said tube sheets for introducing liquid to be concentrated into said tubes, said liquid flowing through said tubes and being received in concentrated form within said vapor chamber;

outlet means toward the side to which the tubes are inclined communicating with said vapor chamber for receiving the concentrated liquid; and means connected to said outlet means for normally preventing any recirculation of the concentrated liquid into said tubes but for automatically recirculating said concentrated liquid through said tubes only in response to a predetermined increase in liquid level of the concentrated liquid.

15. In an evaporation system for concentrating a liquid, in combination:

calandria means including an upstanding cylindrical heating chamber having a vertical axis, a plurality of substantially vertical parallel tubes disposed within said heating chamber, and a pair of sloping tube sheets at opposite ends of said tubes, said tubes extending along axes which are angularly disposed with respect to said vertical axis and which meet said tube sheets at right angles;

means connected to said calandria means for supplying heating fluid thereto, said heating fluid including both condensible and incondensible gases;

means forming a pair of separate openings in said calandria means, the condensible gases being condensed within said heating chamber and the resulting condensate being withdrawn from said calandria means through one of said openings, the incondensible gases being withdrawn from said calandria means through the other of said openings;

baffle means disposed within said heating chamber and forming a path of gradually decreasing cross section for the fluid within said chamber;

means defining a cylindrical vapor chamber positioned superjacent the upper one of said tube sheets in communication with the interior of said tubes, said vapor chamber being disposed along an axis parallel to but spaced from the axis of said calandria means toward the side to which the tubes are inclined;

means positioned adjacent the other of said tube sheets for introducing liquid to be concentrated into said tubes, said liquid flowing through said tubes and being received in concentrated form within said vapor chamber;

outlet means communicating with said vapor chamber for receiving the concentrated liquid; and means connected to said outlet means for normally preventing any recirculation of the concentrated liquid into said tubes but for automatically recirculating said concentrated liquid through said tubes only in response to a predetermined increase in liquid level of the concentrated liquid.

16. In an evaporation system for concentrating a liquid, in combination:

calandria means including a cylindrical heating chamber having a vertical axis, a plurality of substantially vertical parallel tubes disposed within said heating chamber, and a pair of sloping tube sheets at opposite ends of said tubes, said tubes extending along axes which are angularly disposed with respect to said vertical axis and which meet said tube sheets at right angles;

means connected to said calandria means for supplying heating fluid thereto, said heating fluid including both condensible and incondensible gases;

means forming a pair of separate openings in said calandria means, the condensible gases being condensed within said heating chamber and the resulting condensate being withdrawn from said calandria means through one of said openings, the incondensible gases being withdrawn from said calandria means through the other of said openings;

baffle means disposed within said heating chamber and forming a path of gradually decreasing cross section for the fluid within said chamber;

means defining a cylindrical vapor chamber positioned superjacent the upper one of said tube sheets in communication with the interior of said tubes, said vapor chamber being disposed along an axis parallel to but spaced from the axis of said calandria means toward the side to which the tubes are inclined;

means positioned adjacent the other of said tube sheets for introducing liquid to be concentrated into said tubes, said liquid flowing through said tubes and being received in concentrated form within said vapor chamber;

outlet means communicating with said vapor chamber for receiving the concentrated liquid, said outlet means including a discharge enclosure in direct open communication with said vapor chamber and an outfeed conduit leading from said discharge enclosure, said discharge enclosure being externally disposed with respect to said calandria means; and means connected to said outlet means for automatically recirculating said concentrated liquid through said tubes in response to a predetermined change in liquid level within said vapor chamber, the recirculating means including a recirculation conduit having one end protruding into said discharge enclosure and being disposed at a level higher than said outfeed conduit.

17. In an evaporation system for concentrating a liquid, in combination:

calandria means including a heating chamber having a plurality of substantially vertical parallel tubes disposed therein;

means connected to said calandria means for supplying heating fluid thereto;

means defining a vapor chamber positioned superjacent said calandria means in communication with the interior of said tubes;

means for introducing liquid to be concentrated into said tubes, said liquid flowing through said tubes and being received in concentrated form within said vapor chamber;

outlet means communicating with said vapor chamber for receiving the concentrated liquid, said outlet means including a discharge enclosure in direct open communication with said vapor chamber and an outfeed conduit leading from said discharge enclosure, said discharge enclosure being externally disposed with respect to said calandria means; and means connected to said outlet means for normally preventing recirculation of the concentrated liquid into said tubes but including a recirculation conduit separate from said outfeed conduit for automatically recirculating said concentrated liquid through said tubes in response to a predetermined condition, one end of said recirculation conduit protruding into said discharge enclosure and being disposed at a level higher than said outfeed conduit.

References Cited

UNITED STATES PATENTS

| 378,843 | 2/1888 | Lillie | 159—44 X |
|---|---|---|---|
| 1,049,425 | 1/1913 | Webre | 159—27 |
| 2,193,483 | 3/1940 | Hinckley | 159—44 X |
| 2,485,689 | 10/1949 | Baumann | 159—23 |
| 3,102,062 | 8/1963 | Graham et al. | 159—44 X |
| 3,242,970 | 3/1966 | Schmole | 159—27 X |

FOREIGN PATENTS

| 82,755 | 12/1894 | Germany. |
|---|---|---|
| 203,157 | 7/1956 | Australia. |

NORMAN YUDKOFF, Primary Examiner

J. SOFER, Assistant Examiner

U.S. Cl. X.R.

159—27, 44